United States Patent Office 3,280,103
Patented Oct. 18, 1966

---

3,280,103
PRODUCTION OF METHYL 6-CHLORO-6-DEOXY-α-D-GLUCOPYRANOSIDE
Henry B. Sinclair, Peoria, Ill., assignor to the United States of America as represented by the Secretary of Agriculture
No Drawing. Filed Sept. 4, 1964, Ser. No. 394,635
1 Claim. (Cl. 260—210)

A nonexclusive, irrevocable, royalty-free license in the invention herein described, throughout the world for all purposes of the United States Government, with the power to grant sublicenses for such purposes, is hereby granted to the Government of the United States of America.

This invention relates to greatly simplified and much more effective process for preparing the compound methyl 6-chloro-6-deoxy-α-D-glucopyranoside, which chlorinated hexose Helferich et al. obtained in yields not exceeding about 8 percent by successively subjecting methyl α-D-glucoside to tritylation with trityl chloride, acetylation with acetic anhydride, chlorination with $PCl_5$, and hydrolysis with barium hydroxide, Ber. 60B: 2002 (1927).

The investigation of chlorinated hexoses has undoubtedly been inhibited by the complexity of the Helferich et al. method as well as by the very poor yields. Accordingly, the principal object of the present invention is a greatly simplified process for preparing halogenated hexoses and specifically the compound methyl 6-chloro-6-deoxy-α-D-glucopyranoside. Another object is a process for obtaining greatly improved yields of halogenated hexoses. A more specific object is a simplified process for obtaining the said chlorinated hexose compound in yields of at least 30–35 percent based on the methyl α-D-glucoside starting material.

In accordance with the objects of the invention I have now discovered not only that a surprisingly high extent of replacement of the 6-hydroxy groups of methyl glucocide by chlorine occurs when a dimethylformamide solution of methyl-α-D-glucoside is treated with sulfur monochloride ($S_2Cl_2$) but also that the 6-chloro-6-deoxy-α-D-glucopyranoside present in the sulfur-free filtrate obtained after aqueous hydrolysis of excess sulfur monochloride is adsorbed on and is very selectively eluted with 12 percent ethanol from an activated charcoal column despite preceding elutions of the inorganic salts with water and the unreacted methyl glucoside with 5 percent ethanol.

The following example is intended to illustrate my invention in greater detail.

Example

In a stoppered flask sulfur monochloride, 15 ml., was added to 10 g. of methyl α-D-glucopyranoside, M.P. 164–166° C., dissolved in 250 ml. of dimethylformamide. A canary yellow milkiness immediately developed and the solution warmed slightly from the exothermic reaction. After cooling the flask under a tap, it was allowed to stand overnight. Then the excess sulfur monochloride was hydrolyzed by successive additions of water, each being followed by a period of cooling under the tap. After filtering through kieselguhr directly into a dilute solution of sodium carbonate that adjusted the pH to about 8, thereby preventing acidic conversion of the glucoside, the diluted solution was concentrated in vacuo to about 750 ml., refiltered, the clear filtrate placed on a column of activated charcoal, the inorganic salts eluted with 4 l. of water, the unreacted methyl glucoside was next eluted with 4 l. of 5 percent ethanol, and the methyl 6-chloro-6-deoxy-α-D-glucopyranoside was then selectively eluted with 4 l. of 12 percent ethanol. Concentration of the final eluate on a steam bath gave 4.57 g. of an oil that crystallized on standing for several hours. The crystalline material was purified by dissolving in 20 ml. absolute ethanol, boiling the solution for about 10 minutes, filtering while hot, evaporating to dryness, redissolving in ethanol, heating to a boil, slowly adding about 50 ml. of ethyl acetate to flocculate traces of kieselguhr, filtering while hot, concentrating the filtrate in vacuo at room temperature, and allowing the concentrate to form crystals on standing. There were obtained 3.50 g. of crystalline methyl 6-chloro-6-deoxy-α-D-glucopyranoside, M.P. 110–112° C. Horizontal paper chromatography in a solvent consisting of 3 parts butanol, 1 part isopropanol, and 1 part water and employing $AgNO_3$—NaOH as the dipping agent revealed only one spot having an $R_f$ of 0.61 (methyl glycopyranoside $R_f$ 0.29).

I claim:
A process for obtaining pure methyl 6-chloro-6-deoxy-α-D-glucopyranoside in yields of about 30–35 percent based on the methyl glucoside comprising reacting sulfur monochloride with a dilute solution of methyl α-D-glucopyranoside in dimethylformamide, allowing the reacted solution to stand overnight, successively adding small portions of water to hydrolyze excess sulfur monochloride, filtering through kieselguhr to remove the resulting free sulfur, adjusting the pH to about 8.0, concentrating the solution in vacuo, filtering the concentrate, placing the filtrate on an activated charcoal column, successively washing the column with water, 5 percent ethanol, and lastly 12 percent ethanol to fractionally elute respectively the inorganic salts, unreacted methyl glucoside, and the methyl 6-chloro-6-deoxy-α-D-glucopyranoside, evaporating the last named eluate to a slowly crystallizable oil, boiling the crystallized oil in absolute ethanol, filtering the hot material, adding ethyl acetate to flocculate any traces of kieselguhr, filtering the still hot solution, concentrating the solution at room temperature, allowing the concentrate to form crystals of methyl 6-chloro-6-deoxy-α-D-glucopyranoside, and harvesting the said crystals therefrom.

No references cited.

LEWIS GOTTS, Primary Examiner.

J. R. BROWN, Assistant Examiner.